United States Patent
Wang et al.

(10) Patent No.: US 9,772,892 B2
(45) Date of Patent: Sep. 26, 2017

(54) RECOVERY METHOD FOR PORTABLE TOUCH-CONTROL DEVICE AND PORTABLE TOUCH-CONTROL DEVICE USING THE SAME

(71) Applicant: MediaTek Singapore Pte. Ltd., Singapore (SG)

(72) Inventors: Qi Wang, Baotou (CN); Tsung-Yueh Chiang, Taichung (TW); Tzu-Yu Lee, New Taipei (TW)

(73) Assignee: MediaTek Singapore Pte. Ltd., Singapore (SG)

( * ) Notice: Subject to any disclaimer, the term of this patent is extended or adjusted under 35 U.S.C. 154(b) by 141 days.

(21) Appl. No.: 14/723,478

(22) Filed: May 28, 2015

(65) Prior Publication Data

US 2015/0347234 A1 Dec. 3, 2015

(30) Foreign Application Priority Data

May 28, 2014 (CN) .......................... 2014 1 0230527

(51) Int. Cl.
*G06F 11/00* (2006.01)
*G06F 11/07* (2006.01)

(52) U.S. Cl.
CPC ...... *G06F 11/0742* (2013.01); *G06F 11/0793* (2013.01)

(58) Field of Classification Search
CPC .................... G06F 11/0742; G06F 11/0793
USPC .......................................... 714/38.1
See application file for complete search history.

(56) References Cited

U.S. PATENT DOCUMENTS

| 8,088,011 B2 * | 1/2012 | Russell ............... G06F 11/0709 463/42 |
| 2004/0210743 A1 * | 10/2004 | Burky ................. G06F 9/30181 712/218 |
| 2014/0282832 A1 * | 9/2014 | Chanoch ................ G06F 21/54 726/1 |
| 2015/0293822 A1 * | 10/2015 | Chun ................ G06F 11/1048 714/6.13 |

* cited by examiner

*Primary Examiner* — Yair Leibovich
(74) *Attorney, Agent, or Firm* — Winston Hsu

(57) ABSTRACT

A recovery method used by a portable touch-control device is disclosed. The portable touch-control device comprises a storage for storing a program The recovery method comprises: executing the program by the portable touch-control device; detecting an exception condition when an exception occurred during executing the program; analyzing the exception condition to determine at least one module corresponding to the exception condition; determining a predetermined exception processing logic according to the module; and performing a recovery process according to the predetermined exception processing logic to recovery the portable touch-control device by itself.

18 Claims, 5 Drawing Sheets

RECOVERY METHOD FOR PORTABLE TOUCH-CONTROL DEVICE AND PORTABLE TOUCH-CONTROL DEVICE USING THE SAME

BACKGROUND

The disclosed embodiments of the present invention relate to device recovery, and more particularly, to a recovery method for a portable touch-control device.

As the mobile communication develops fast, different kinds of portable touch-control device, for instance, smart phone, tablet and personal digital assistant (PDA), have been on the market. Thus, hardware quality of the portable touch-control device is varied. Some portable touch-control devices may not be able to start due to procedure errors therein (for example, a key file is damaged in the portable touch-control device). In addition, users' improper usage may cause the portable touch-control device unable to operate normally.

The general operating system (OS) in portable touch-control device such as Android system is unable to fix or recover for the above errors by itself, and the users have to brush machine in recovery center when their portable touch-control device are unable to recover. Therefore, it is desirable to solve the above mentioned problem.

SUMMARY

In accordance with exemplary embodiments of the present invention, a recovery method used by a portable touch-control device and a portable touch-control device are proposed to solve the above-mentioned problem.

According to an aspect of the present invention, a recovery method used by a portable touch-control device is disclosed. The portable touch-control device comprises a storage for storing a program, the recovery method comprises: executing the program by the portable touch-control device; detecting an exception condition when an exception occurred during executing the program; analyzing the exception condition to determine at least one module corresponding to the exception condition; determining a predefined exception processing logic according to the module; and performing a recovery process according to the predefined exception processing logic to recover the portable touch-control device by itself. In particular, the method further comprises: determining whether the module is a registered module; and determining whether the portable touch-control device is capable of recovering the exception condition; wherein if the module is a registered module and the portable touch-control device is capable of recovering the exception condition, determining the exception condition is recovered by the portable touch-control device.

According to another aspect of the present invention, a portable touch-control device is disclosed. The portable touch-control device comprises: a storage, storing a program; and a processor, for executing the program; detecting an exception condition when an exception occurred during executing the program; analyzing the exception condition to determine at least one module corresponding to the exception condition; determining a predefined exception processing logic according to the module; and performing a recovery process according to the predefined exception processing logic to recover the portable touch-control device by itself. In particular, the processor further determines whether the module is a registered module; and determines whether the portable touch-control device is capable of recovering the exception condition; wherein if the module is a registered module and the portable touch-control device is capable of recovering the exception condition, determines the exception condition is recovered by the portable touch-control device.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

One embodiment of the present invention is to provide a portable touch-control device recovery method that is flexible, high efficient, and has high extensibility and user defined functions. The portable touch-control device recovery method has following characteristics: manufacturing vendors can flexibly extend modules requiring detection (i.e., registered modules) according to design spec; the whole recovery process is not required to enter any special recovery mode, and users do not have to turn off/on their portable touch-control devices again by themselves. The method disclosed by the present invention can be applied to different portable touch-control device OSs. Further details are described as below by using Android operating system (OS). Specifically, the present invention can be applied to all requirements of self-recovery, and there is no special limitation.

Figure 1:
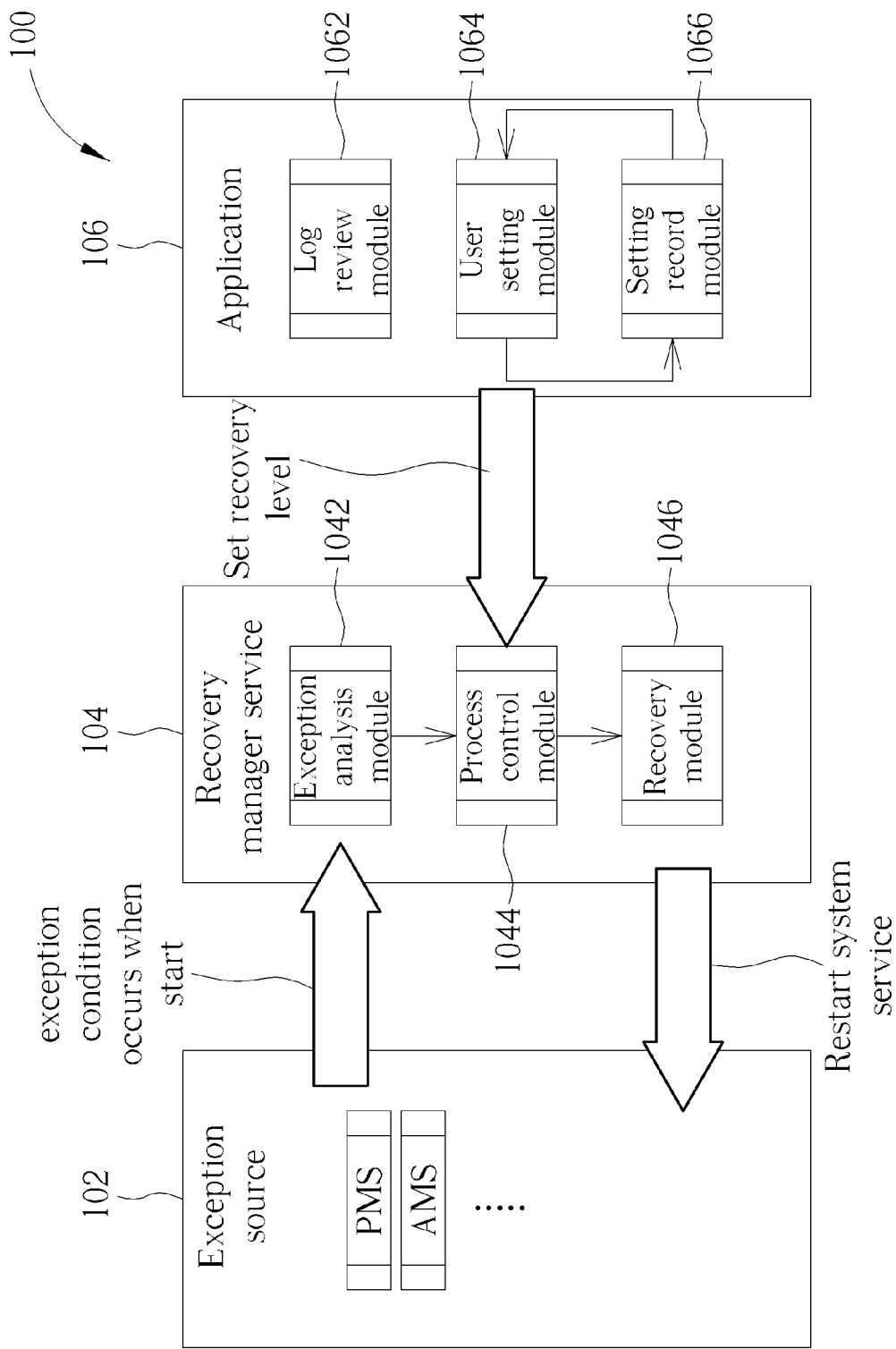
FIG. 1 is a diagram illustrating a portable touch-control device 100 using Android OS according to an embodiment of the present invention.

Please refer to FIG. 1. FIG. 1 is a diagram illustrating a portable touch-control device 100 according to an embodiment of the present invention. The portable touch-control device 100 may be a smart phone, a PDA or a tablet. And the invention is not limited by this. The portable touch-control device 100 comprises: an exception source 102, a recovery manager service 104, and an application 106. These modules may comprise storages (not shown) for storing programs, or the portable touch-control device may comprise storage for storing programs. Furthermore, these modules may be executed by a processor. The exception source can be a module in which error/exception occurred. The exception source can also be a relay module, which detects or receives a report about an error/exception in a module. In an embodiment, the exception source can be a system server. The system server comprises a plurality of modules with different functions/services, such as a package management service (PMS) and an activity management service (AMS). Moreover, since the system server does not have complete function of exception analysis and recovery itself, the recovery manager service 104 and the application procedure 106 are added to have the function. During the start process, the system server would load system key modules (such as aforementioned PMS and AMS) one by one. When there is an exception condition for loading certain module due to a corresponding system file being damaged, the system server would capture the exception condition and send it to the recovery manager service 104 for analysis and process. Please note that, the invention is not limited by this. In other embodiments, the exception source 102 can be a native service module or kernel module.

The recovery manager service 104 can be regarded as a platform, and designers can increase/change design base on a fundamental recovery scheme of the platform. For example, new modules may be developed in the exception source (such as system server) 102, and the designer can define new recovery logics for the new modules on the platform provided by the recovery manager service 104. Specifically, an exception analysis module 1042 in the recovery manager service 104 may perform an exception analysis for the exception condition to determine the module having an exception condition, and inform a process control module 1044 to find out a corresponding process scheme. The process control module 1044 may determine a recovery scheme for the exception condition according to the built-in exception handler policy, such as file deleting, backup file recovery, or other process procedures (such as perform some user-defined operation). The correlation of the recovery scheme and the exception condition may be stored in a memory (not shown) in or coupled to the recovery manager service 104. After the recovery scheme is determined, a recovery module 1046 may perform the corresponding recovery operation, and inform the exception source 102 to restart the system service.

As for the application 106, the user may use a log review module 1062 in the application procedure to review the past exception condition record. Moreover, the user may select or change a recovery level via a user setting module 1064, and save/update the option or change in a setting record module 1066. For example, there are three recovery levels: stopping service, basic recovery, and maximum recovery. In the stopping service level, the recovery manager service 104 would not provide any recovery service, but only record an exception condition when there is an exception condition. In the basic recovery level, the recovery manager service 104 only perform the system recovery according to the pre-defined recovery rules, and if the recovery fails, no further recovery process is performed. In the maximum recovery level, if the recovery fails, the recovery manager service 104 would further adopt the factory recovery mode of keeping user's data to try to recover the system, or repeat the recovery procedure according to the predetermined recovery rule. The normal factory recovery mode is to format data partition and clear all the user data (including all the applications and applications data). But the user's application would not affect the system most of the times. The above mentioned factory recovery mode of keeping user's data is based on the normal factory mode, while keeping user's applications and application data (such as contacts and messages). Please note that, the invention is not limited by this. Besides, those skilled in the art following the invention could set different recovery levels and recovery patterns, and these alterations may be made while retaining the teachings of the invention. Further details of the recovery manager service 104 and the application procedure 106 are described as below.

Figure 2:
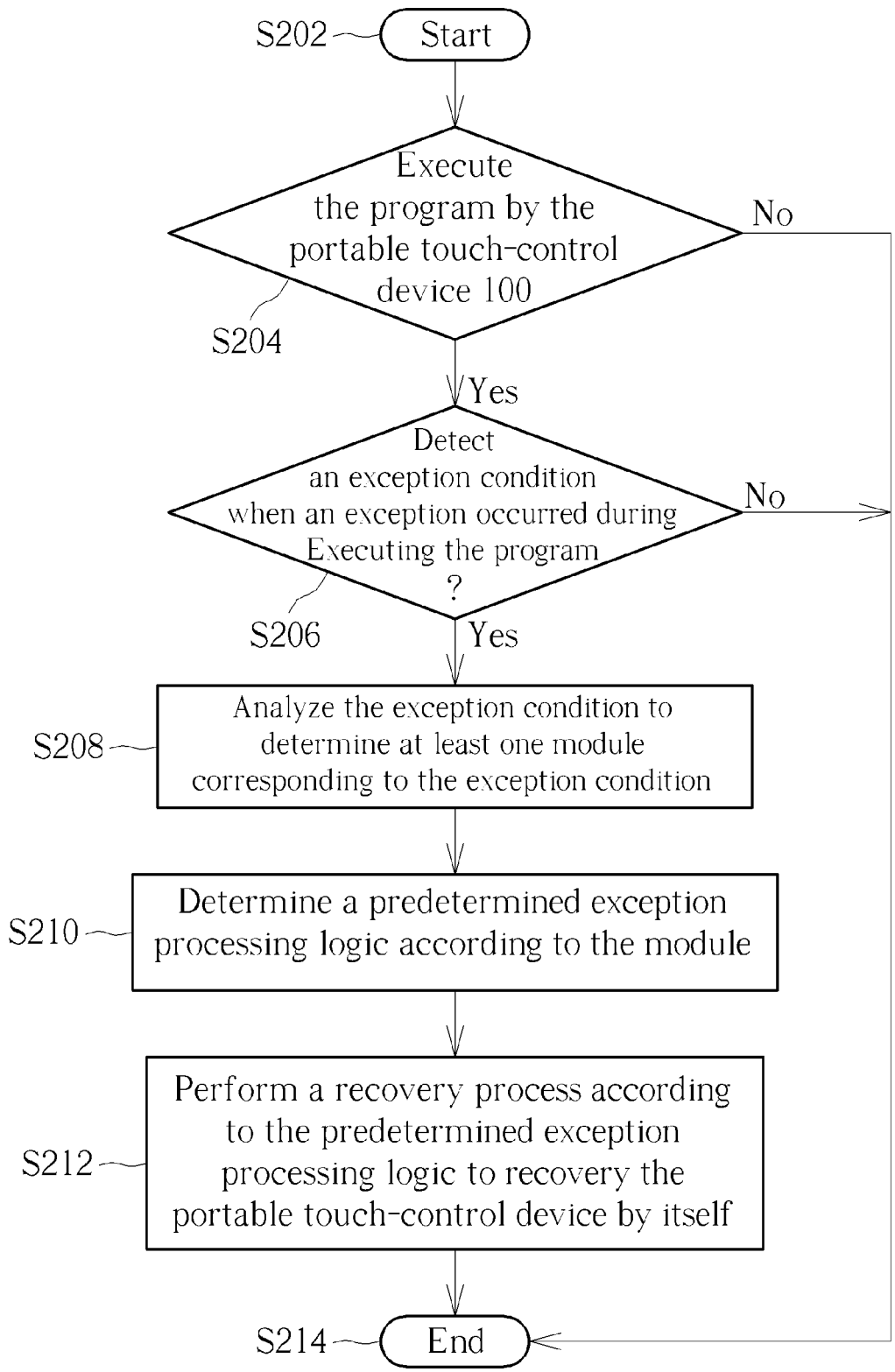
FIG. 2 is a flowchart illustrating a recovery method applied to the Android OS according to a first exemplary embodiment of the present invention.

Please refer to FIG. 2. FIG. 2 is a flowchart illustrating a recovery method according to an embodiment of the present invention. The method may be applied to the portable touch-control device 100 shown in FIG. 1. The portable touch-control device 100 comprised a storage for storing a program. The recovery method comprises the following steps:

Step S202: Start.

Step S204: Execute the program by the portable touch-control device 100.

Step S206: Detect an exception condition when an exception occurred during executing the program.

Step S208: Analyze the exception condition to determine at least one module corresponding to the exception condition.

Step S210: Determine a predetermined exception processing logic according to the module.

Step S212: Perform a recovery process according to the predetermined exception processing logic to recovery the portable touch-control device by itself.

Step S214: End.

Figure 3:
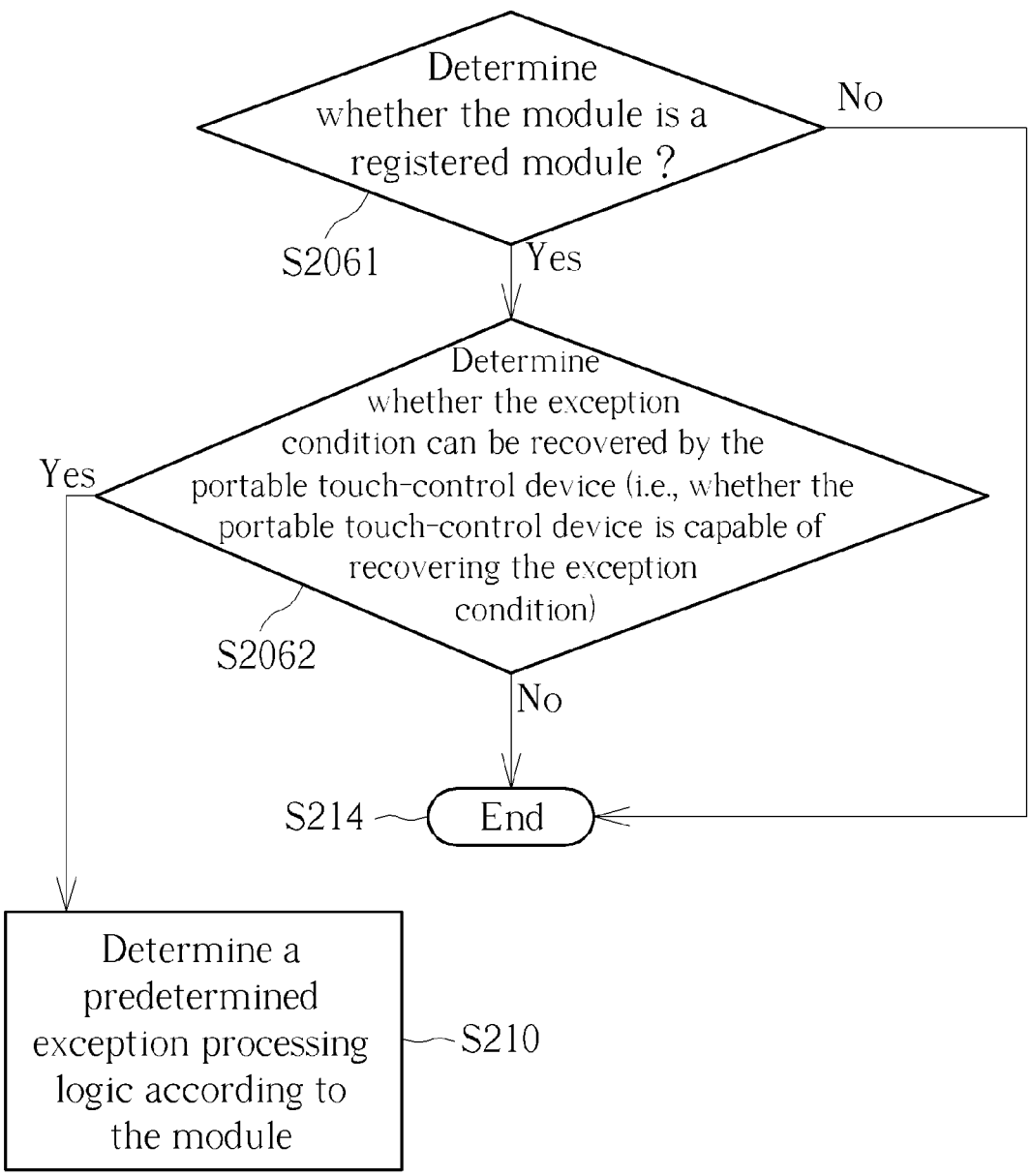
FIG. 3 is a flowchart illustrating a recovery method applied to the Android OS according to a second exemplary embodiment of the present invention.

In an embodiment, a step of executing the program may be added between steps S212 and S214. In another embodiment, step S208 is to determine whether the module having the exception condition registers the corresponding predefined exception processing logic and generate an exception condition analysis result. In yet another embodiment, step S208 may further divided into sub-steps. Please refer to FIG. 3, which is a flowchart illustrating a recovery method according to another embodiment of the present invention. Provided that the result is substantially the same, the steps in FIG. 3 are not required to be executed in the exact order of the flowchart shown in FIG. 3. Moreover, some steps in FIG. 3 can be omitted according to different embodiments or design requirements. Also, some steps in FIG. 3 may not be executed continuously and other steps may be inserted thereof. According to the embodiment, the recovery method comprises the following steps:

Step S2061: Determine whether the module is a registered module? If yes, then go to step S2062; if no, then go to step S214.

Step S2062: Determine whether the exception condition can be recovered by the portable touch-control device (i.e., whether the portable touch-control device is capable of recovering the exception condition). If yes, then go to Step S210; if no, then go to Step S214. In an embodiment, if the exception condition is caused by a damaged file, then determine the portable touch-control device 100 is capable of recovering the exception condition. And if the exception condition is not caused by a damaged file, then determine the portable touch-control device 100 is not capable of recovering the exception condition.

Please note that in an embodiment, the predetermined exception processing logic may be read from a memory (not shown) in or coupled to the portable touch-control device. And the memory saves the predefined exception processing logic corresponding to all the registered modules. In yet another embodiment, the predefined exception processing logic corresponding to the module has to be registered in the portable touch-control device 100 (e.g. via a specific file, recovery.xml), then the portable touch-control device 100 can recover the module when the module has errors.

Figure 4:
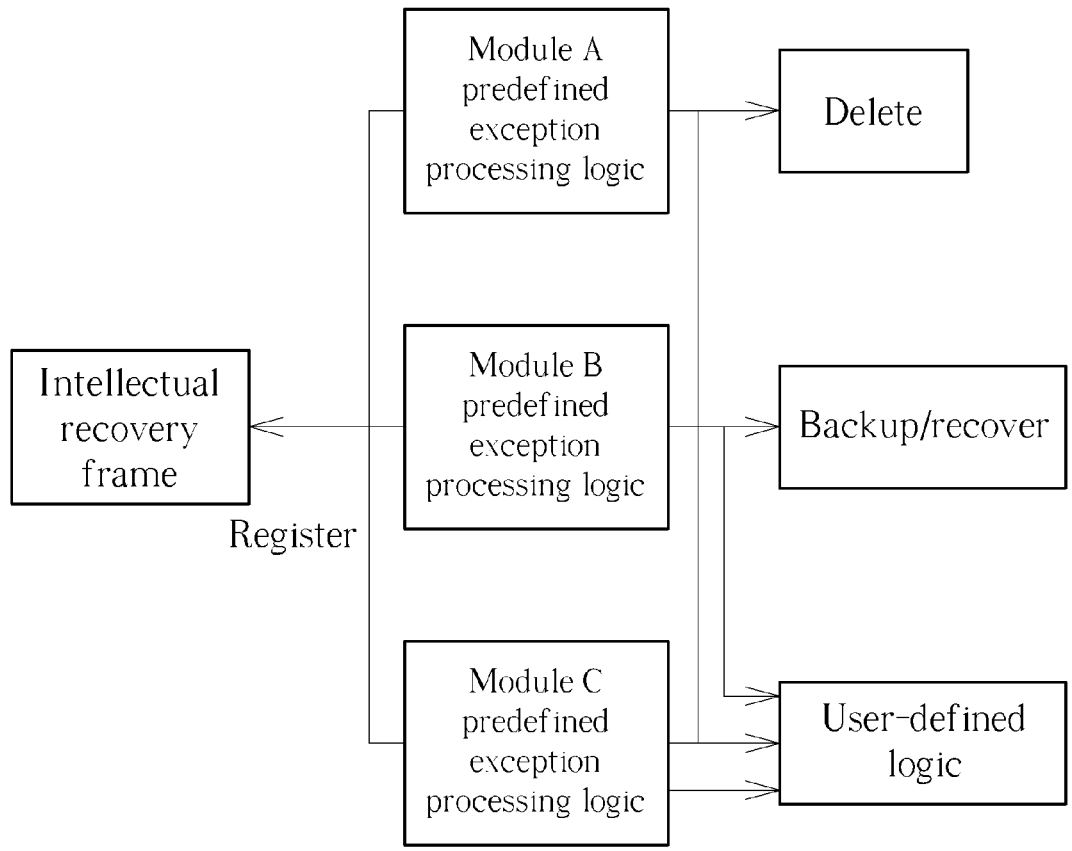
FIG. 4 is a diagram illustrating the correspondence between the modules and the predetermined exception processing logic according to an embodiment of the present invention.

Moreover, the content of each predetermined exception processing logic in the portable touch-control device 100 may be determined according to the function of corresponding module. FIG. 4 is a diagram illustrating the correspondence between the modules and the predetermined exception processing logic according to an embodiment of the present invention. As shown in FIG. 4, different modules may correspond to different predetermined exception processing logic. For example, the corresponding predefined exception processing logic of a module A which is capable of regenerating file is directly delete a damaged file when the file has an exception condition. The corresponding predefined exception processing logic of a module B with a file having important data is restore a backup file for a damaged file when the file has an exception condition. In an embodiment, the backup file may be generated by the portable touch-control device 100 actively in normal times. As for a special module (such as module C), exclusive recovery procedures can be additionally defined in a specific file (such as recovery.jar) to provide for the portable touch-control device 100. In other words, the corresponding predetermined exception processing logic of the module C may be a user-defined logic. The module A and B may also adopt the user-defined logic. And the invention is not limited by this. Those skilled in the art would adopt other predetermined exception processing logic according to different design requirements.

According to another embodiment, before the step S212, the recovery manager service 104 may receive a recovery level from the application 106. As stated above, in an embodiment, there are three recovery levels: stopping service, basic recovery, and maximum recovery. In the stopping service level, the recovery manager service 104 may terminate the following step (step S214). In the basic recovery level, if the recovery process in step S212 fails, the recovery manager service 104 would not perform further operations. In the maximum recovery level, if the recovery process in step S212 fails, the recovery manager service 104 would further adopt the factory recovery mode of keeping user's data to try to recover the system, or repeat the step S212.

In additional, if the system server 102 still can not restart the system service normally, and send the exception condition to the recovery manager service 104, the recovery manager service 104 may repeat the recovery method. However, for a condition of unable to recover, repeating the recovery method can be limited in a repeat number to avoid over and meaningless repeating action which may increase problem analysis difficulty in the future. For example, the maximum repeat number of repeating the recovery method can be 3.

Figure 5:
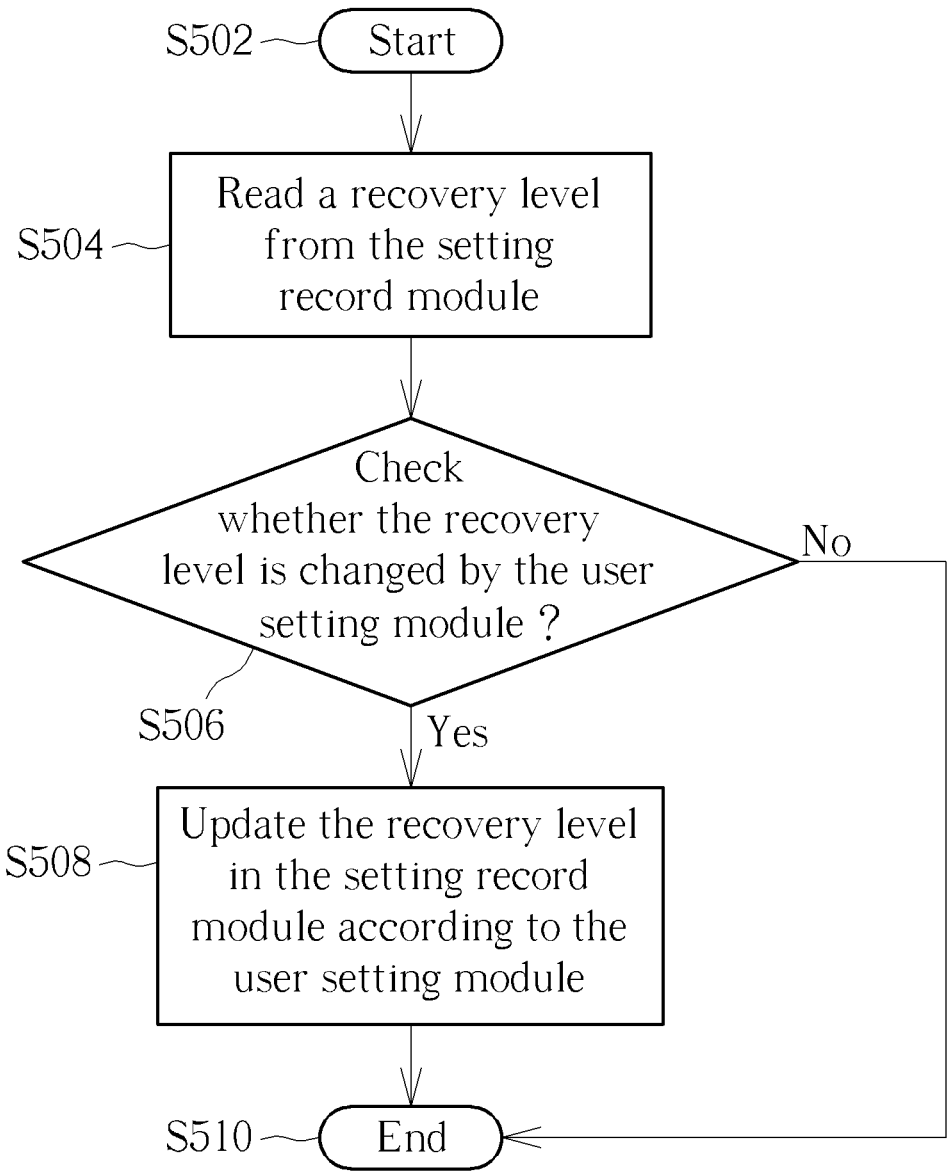
FIG. 5 is a flowchart illustrating a recovery level determination method according to an embodiment of the present invention.

FIG. 5 is a flowchart illustrating a recovery level determination method according to an embodiment of the present invention. Provided that the result is substantially the same, the steps in FIG. 5 are not required to be executed in the exact order of the flowchart shown in FIG. 5. Moreover, some steps in FIG. 5 can be omitted according to different embodiments or design requirements. Also, some steps in FIG. 5 may not be executed continuously and other steps may be inserted thereof. According to the embodiment, the recovery level determination method comprises the following steps:

Step S502: Start.

Step S504: Read a recovery level from the setting record module 1066.

Step S506: Check whether the recovery level is changed by the user setting module 1064. If yes, then go to step S508; if no, then go to step S510.

Step S508: Update the recovery level in the setting record module 1066 according to the user setting module 1064.

Step S510: End.

Briefly summarized, the present invention can prevent the portable touch-control device from unable to start due to file errors, and the users do not have to repeat operations of turning on/off actively, and the portable touch-control device can be recovered without the users' notice.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A recovery method used by a portable touch-control device, the portable touch-control device comprising a storage for storing a program, the recovery method comprising:
   executing the program by the portable touch-control device;
   detecting an exception condition when an exception occurred during executing the program;
   analyzing the exception condition to determine at least one module corresponding to the exception condition;
   determining a predefined exception processing logic according to the module; and
   performing a recovery process according to the predefined exception processing logic to recover the portable touch-control device by itself, wherein the step of analyzing the exception condition comprises determining whether the module having the exception condition registers the corresponding predefined exception processing logic.

2. The recovery method of claim 1, wherein the step of analyzing the exception condition further comprises generating an exception condition analysis result.

3. The recovery method of claim 2, further comprising:
   determining whether the module is a registered module; and
   determining whether the portable touch-control device is capable of recovering the exception condition;
   wherein if the module is a registered module and the portable touch-control device is capable of recovering the exception condition, determining the exception condition is recovered by the portable touch-control device.

4. The recovery method of claim 3, wherein if the exception condition is caused by a damaged file, then determining the portable touch-control device is capable of recovering the exception condition, and if the exception condition is not caused by a damaged file, then determining the portable touch-control device is not capable of recovering the exception condition.

5. The recovery method of claim 1, further comprising:
   executing the program after finishing the recovery process.

6. The recovery method of claim 1, further comprising:
before performing the recovery process, determining a recovery level by the portable touch-control device, and performing the recovery process according to the recovery level.

7. The recovery method of claim 6, wherein the recovery level is selected from stopping service, performing basic recovery and performing maximum recovery.

8. The recovery method of claim 6, wherein the recovery level is determined according to a user setting.

9. The recovery method of claim 1, wherein the predefined exception processing logic is selected from deleting a damaged file, restoring a backup file for the damaged file, and performing a user-defined operation.

10. A portable touch-control device, comprising:
a storage, storing a program; and
a processor, for executing the program; detecting an exception condition when an exception occurred during executing the program; analyzing the exception condition to determine at least one module corresponding to the exception condition; determining a predefined exception processing logic according to the module; and performing a recovery process according to the predefined exception processing logic to recover the portable touch-control device, wherein the processor determines whether the module having the exception condition registers the corresponding predefined exception processing logic.

11. The portable touch-control device of claim 10, wherein the processor further generates an exception condition analysis result.

12. The portable touch-control device of claim 11, wherein the processor further determines whether the module is a registered module; and determines whether the portable touch-control device is capable of recovering the exception condition; wherein if the module is a registered module and the portable touch-control device is capable of recovering the exception condition, determines the exception condition is recovered by the portable touch-control device.

13. The portable touch-control device of claim 12, wherein if the exception condition is caused by a damaged file, then the processor determines the portable touch-control device is capable of recovering the exception condition, and if the exception condition is not caused by a damaged file, then the processor determines the portable touch-control device is not capable of recovering the exception condition.

14. The portable touch-control device of claim 11, wherein the processor determines a recovery level before performing the recovery process, and performs the recovery process according to the recovery level.

15. The portable touch-control device of claim 14, wherein the recovery level is selected from one of stopping service, performing basic recovery and performing maximum recovery.

16. The portable touch-control device of claim 14, wherein the recovery level is determined according to a user setting.

17. The portable touch-control device of claim 10, the processor further executes the program after finishing the recovery process.

18. The portable touch-control device of claim 10, wherein the predefined exception processing logic is selected from deleting a damaged file, restoring a backup file for the damaged file, and performing a user-defined operation.

* * * * *